US010158463B1

(12) United States Patent
Oroskar et al.

(10) Patent No.: US 10,158,463 B1
(45) Date of Patent: Dec. 18, 2018

(54) METHOD AND SYSTEM FOR COORDINATED TRANSMISSION WITH USE OF NEIGHBORING BASE STATION SCHEDULING POLICY

(71) Applicant: Sprint Spectrum L.P., Overland Park, KS (US)

(72) Inventors: Siddharth S. Oroskar, Overland Park, KS (US); Jasinder P. Singh, Olathe, KS (US); Suryanarayanan Ramamurthy, Plano, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 671 days.

(21) Appl. No.: 14/659,875

(22) Filed: Mar. 17, 2015

(51) Int. Cl.
  *H04L 5/00* (2006.01)
  *H04W 72/04* (2009.01)
  *H04W 72/12* (2009.01)
  *H04W 88/08* (2009.01)

(52) U.S. Cl.
  CPC .......... *H04L 5/0035* (2013.01); *H04L 5/0007* (2013.01); *H04W 72/0413* (2013.01); *H04W 72/0426* (2013.01); *H04W 72/0493* (2013.01); *H04W 72/1236* (2013.01); *H04W 72/1242* (2013.01); *H04W 88/08* (2013.01)

(58) Field of Classification Search
  None
  See application file for complete search history.

(56) References Cited

U.S. PATENT DOCUMENTS 8,675,511 B2   3/2014   Gorokhov et al.

| 8,838,110 | B2* | 9/2014 | Zhang | H04W 36/0072 |
| | | | | 370/331 |
| 2008/0274759 | A1* | 11/2008 | Chen | H04W 72/005 |
| | | | | 455/507 |
| 2009/0213730 | A1* | 8/2009 | Zeng | H04W 24/04 |
| | | | | 370/217 |
| 2010/0142462 | A1* | 6/2010 | Wang | H04B 7/024 |
| | | | | 370/329 |
| 2012/0176978 | A1* | 7/2012 | Kim | H04W 72/0426 |
| | | | | 370/329 |

(Continued)

FOREIGN PATENT DOCUMENTS

WO   WO2014/094191   6/2014

OTHER PUBLICATIONS

Costa-Requena et al, "Mobile backhaul transport streamlined through SDN" Jul. 5-9, 2015, IEEE Xplore Aug. 13, 2015 issue, Budapest, Hungary.*

(Continued)

*Primary Examiner* — Xavier Wong

(57) ABSTRACT

A method and system to manage coordinated transmission of data in a wireless communication system. When a serving base station receives data of a particular class for transmission to a user equipment device (UE), the serving base station transmits the received data to the UE and sends a proper subset of the received data to a neighboring base station for the neighboring base station to also transmit to the UE optimally concurrently with the serving base station's transmission of the proper subset. To help comply with a policy in place at the neighboring base station, the serving base station decides how much of the received data to send to the neighboring base station as the proper subset by (i) determining what scheduling weight the neighboring base station is set to apply for data of the particular class and (ii) applying that determined scheduling weight to the received data.

20 Claims, 4 Drawing Sheets

(56) References Cited

U.S. PATENT DOCUMENTS

| | | | |
|---|---|---|---|
| 2012/0213261 A1* | 8/2012 | Sayana | H04L 5/0094 |
| | | | 375/224 |
| 2013/0003534 A1* | 1/2013 | Henry | H04W 40/00 |
| | | | 370/228 |
| 2013/0301422 A1 | 11/2013 | Caretti et al. | |
| 2014/0211756 A1* | 7/2014 | Bontu | H04W 36/04 |
| | | | 370/331 |
| 2016/0037511 A1* | 2/2016 | Vincze | H04B 7/024 |
| | | | 370/329 |

OTHER PUBLICATIONS

Chai et al, "Two-channel Two-transceiver IEEE 802.16 Wireless Backhaul" Dec. 5-9, 2011, IEEE Xplore Mar. 1, 2012 issue, Houston, TX, USA.*

Venkatesan et al, "Wireless Backhaul for LTE—Requirements, Challenges and Options" Dec. 15-17, 2008, IEEE Xplore May 15, 2009 issue, Mumbai, India.*

Jaber et al, "5G Backhaul Challenges and Emerging Research Directions: A Survey" Apr. 20, 2016, IEEE Access vol. 4.*

Egeland et al, "The reliability of wireless backhaul mesh networks" 2008, http://folk.uio.no/paalee/publications/2008-iswcs.pdf.*

Wu et al, "Lightweight LTE Core Networks Technology" in Mobile Communications (Yidong Tongxin), 2014 vol. 11, ISSN 1006-1010.*

Bundesamt für Sicherheit in der Informationstechnik, "Drahtlose Kommunikationssysteme und ihre Sicherheitsaspekte" 2009.*

Hayashi et al, "Next Generation Mobile Service WiMAX Broadband Wireless Access" Apr. 2007, OKI Technical Review.*

Tsai, "Study on WiMAX Uplink Signals for Design Verification Testing Request" Jul. 2008, Tatung University.*

* cited by examiner

METHOD AND SYSTEM FOR COORDINATED TRANSMISSION WITH USE OF NEIGHBORING BASE STATION SCHEDULING POLICY

BACKGROUND

Unless otherwise indicated herein, the description provided in this section is not prior art to the claims and is not admitted to be prior art by inclusion in this section.

A typical wireless communication system includes a number of base stations each radiating to define a respective cell in which user equipment devices (UEs) such as cell phones, tablet computers, tracking devices, embedded wireless modules, and other wirelessly equipped devices (whether or not operated by a human user), can operate. In turn, each base station may be coupled with network infrastructure that provides connectivity with one or more transport networks, such as the public switched telephone network (PSTN) and/or the Internet for instance. With this arrangement, a UE within coverage of the system may engage in air interface communication with a base station and may thereby communicate via the base station with various remote network entities or with other UEs served by the base station.

Further, a wireless communication system may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communications (GSM), and Wi-Fi, among others. Each protocol may define its own procedures for managing communications with UEs.

In accordance with the air interface protocol, each cell may operate on one or more carrier frequencies or range of carrier frequencies. Further, each cell may define a number of channels or specific resources for carrying signals and information between the base station and UEs. For instance, on the downlink, certain resources may be used to carry a pilot or reference signal that identifies the cell and that UEs may detect and measure as a basis to evaluate coverage, and other resources may be used to carry paging messages, resource-allocation messages, and other such control messages from the base station to UEs. And on the uplink, certain resources may be used to carry registration requests, resource-allocation requests, and other control messages from UEs to the base station. In addition, certain resources on the uplink and downlink may be set aside to carry bearer traffic (e.g., user communications) between the base station and the UEs.

In practice, when a UE enters into coverage of a wireless communication system, the UE may register to be served by a base station that provides the strongest coverage, and the system may responsively establish for the UE one or more bearers each defining a logical connection for carrying communications between the UE and a transport network. Each such bearer, for instance, may include a radio-link portion extending between the UE and the base station, and an access-network portion extending between the base station and a gateway or switch that provides connectivity with the transport network.

When data arrives at the system for transmission to such a UE, the data may then flow over the access-network portion of such a bearer from a gateway or switch to the UE's serving base station, and the base station may transmit the data on the radio-link portion of the bearer to the UE. Likewise, when the UE has data to transmit via the transport network, the UE may transmit the data over the radio-link portion of such a bearer to the base station, and the base station may forward the data over the access-network portion of the bearer to the gateway or switch for output on the transport network.

For various reasons, the provider of a wireless communication system may also apply different scheduling priorities for air interface transmission of different classes of data. As an example, the provider may give a higher scheduling priority to real-time or latency-sensitive data such as voice or video communications than to best-effort traffic such as e-mail and web browsing traffic. And as another example, the provider may give higher scheduling priority to data being communicated with "light users" (e.g., those who do not tend to engage in a level of data communication deemed to be excessive or threshold high) than to "heavy users" (e.g., those who tend to engage in excessive levels of data communication).

To implement such differential scheduling priorities, a base station could be arranged to determine the class of data being communicated in a given instance and to then apply a scheduling appropriate for that class. For instance, the base station could be provided with policy table that correlates each of various data classes with a corresponding scheduling weight (e.g., throttling rate), and when the base station is going to schedule air interface communication of data of a particular class, the base station may refer to that policy table to determine the scheduling weight and may apply the determined scheduling weight, possibly in addition to other scheduling policies. For the downlink, each such scheduling weight may define an extent to which the base station should throttle or otherwise reduce output of data on the air interface in relation to the rate at which the base station receives the data from the network infrastructure. For instance, one scheduling weight corresponding with one class of data may be 1:1, indicating no reduction in output rate, whereas another scheduling weight corresponding with another class of data may be 1:2, indicating a reduction in output rate by a factor of one half. Other examples are possible as well.

Further, the scheduling priorities that a base station is arranged to apply for various classes of data could differ from time to time, based on various factors, such as time of day, cell loading, and the like. For instance, the base station's policy table may define different per-class scheduling weights for particular levels of cell load or for particular times of day. Thus, for a given class of data, the base station may have a policy to apply a particular scheduling weight at certain times or based on one or more other factors but to apply a different scheduling weight at other times or based on one or more other factors.

OVERVIEW

In a wireless communication system, UE reception at cell edges may be problematic for various reasons. For example, the greater distance from the base station to the cell edge may result in lower signal strength. Further, at a cell edge, interference levels from neighboring cells are likely to be higher, as the UE is typically closer to neighboring cells when at a cell edge.

One way to help improve the quality of service at cell edges is to implement a Coordinated Multipoint (CoMP) scheme. In such a scheme, a group or cluster of base stations may improve service at cell edges by coordinating transmission in an effort to avoid inter-cell interference, and in some cases, to convert inter-cell interference into a usable signal that actually improves the quality of service.

One form of CoMP, known as "joint processing" involves multiple base stations concurrently transmitting the same data to the UE on the same air interface resources (e.g., on the same sub-carriers or physical resource blocks) to help improve signal strength and quality. In practice, for instance, a base station that is serving a UE may determine that the UE has relatively low signal strength from the serving base station but that the UE is detecting coverage of a neighboring base station, and the serving base station may then responsively work with the neighboring base station to provide downlink CoMP transmission to the UE. To do this, when the serving base station schedules transmission of data to the UE on specific air interface resources such as particular sub-carriers, the serving base station may also transmit the data to the neighboring base station along with a directive for the neighboring base station to transmit the data at the same time on the same air interface resources. Thus, both base stations would transmit the same data on the same air interfaces at the same time, which may help improve the UE's reception of the data.

In this CoMP process, when a serving base station receives data and directs a neighboring base station to transmit the data to a UE concurrently with the serving base station's transmission of the data to the UE, the neighboring base station may follow the serving base station's directive and thus transmit the data as instructed. Unfortunately, however, this can be contrary to a scheduling policy at the neighboring base station in a scenario where the serving base station and the neighboring base station have different scheduling weights for the data at issue. In particular, if the neighboring base station has a more restrictive scheduling weight for the data, then this process may result in the neighboring base station transmitting the data at a rate contrary to its own policy.

For example, consider a scenario where the serving base station has a scheduling weight of 1:1 for the class of data at issue but the neighboring base station has a scheduling weight of 1:2 for the class of data at issue. If the serving base station receives from the network infrastructure 10 Megabits of such data per second for transmission to a UE, the serving base station may then transmit 10 Megabits of data per second to the UE (putting aside other policy considerations, for simplicity) and may also direct the neighboring base station to transmit the same 10 Megabits of data per second, concurrently, to the UE. As it was directed, the neighboring base station may thus also transmit the 10 Megabits of data per second to the UE. However, if the neighboring base station had itself received those 10 Megabits of such data per second from the network infrastructure for transmission to the UE and had applied its 1:2 scheduling weight, then the neighboring base station may have transmitted just 5 Megabits per second to the UE. Thus, the CoMP transmission by the neighboring base station per the serving base station's directive would be contrary to the neighboring base station's policy for the class of data at issue.

Disclosed herein is a method and system to help avoid this situation. In accordance with the disclosure, when a serving base station receives data of a particular class for transmission to a UE, the serving base station will transmit the received data to the UE and will send a proper subset of the received data (i.e., less than all of the received data) to a neighboring base station for the neighboring base station to also transmit to the UE, and thus not send the remainder of the received data to the neighboring base station for transmission to the UE. Per the disclosure, the serving base station will decide how much of the received data to send to the neighboring base station by (i) determining what scheduling weight the neighboring base station is set to apply for data of the particular class and (ii) applying that determined scheduling weight to the received data.

In the example above, for instance, when the serving base station receives 10 Megabits of data for transmission to the UE, the serving base station may determine that the neighboring base station's scheduling weight is 1:2 and may therefore decide to send just 5 Megabits of that data to the neighboring base station for transmission to the UE. The serving base station may thus itself transmit the 10 Megabits of data to the UE, but the serving base station may direct the neighboring base station to transmit just the 5 Megabits of data to the UE on the same resources on which the serving base station transmits those 5 Megabits of data to the UE. (It should be understood that this is merely an example. In practice, such scheduling and transmission could occur on a different time basis, such as per millisecond for instance, and could involve various other scheduling factors as well.)

Accordingly, in one respect, disclosed is a method of coordinated transmission of data in a wireless communication system, where the wireless communication system comprises a plurality of base stations including a first base station and a second base station, and where the second base station has a policy that defines, for a particular class of data, a respective scheduling weight that the second base station is to apply for transmission of data of the particular class.

In accordance with the method, the first base station receives data of the particular class for transmission by the first base station to a UE served by the first base station, and the first base station transmits the received data to the UE over a first air interface between the first base station and the UE. (In practice, this may be just a portion of a larger set of data that the first base station has received for transmission to the UE, but this is the data at issue here.) Further, the first base station sends to the second base station a proper subset of the received data, for transmission of the proper subset of the received data by the second base station to the UE over a second air interface between the second base station and the UE (e.g., concurrently with the first base station's transmission of the same data per the CoMP process). And in the method, the first base station establishes the proper subset to send to the second base station by (i) determining what scheduling weight the second base station's policy defines for data of the particular class and (ii) applying the determined scheduling weight to the received data to establish the proper subset.

Further, in another respect, disclosed is a method of coordinated transmission of data in a wireless communication system, where the wireless communication system includes a first base station and a second base station. In accordance with the method, the first base station serves a UE over a first air interface between the first base station and the UE, and, while so serving the UE, the first base station (i) receives data of a particular priority level for transmission to the UE over the first air interface, (ii) transmits the received data to the UE over the first air interface, and also (iii) transmits a proper subset of the received data to the second base station for transmission of the proper subset of data from the second base station to the UE over a second air interface between the second base station and the UE. In addition, in this method, the first base station determines a throttling-rate that the second base station is configured to apply for data of the particular priority level and responsively uses that determined throttling-rate to establish how much of the received data should be the proper subset, by (a) applying the determined throttling-rate to the received data. Thus, the first base station then transmits that established proper subset of data to the second base station for transmission to the UE.

Still further, in another respect, disclosed is a base station that is configured to manage coordinated transmission of data to a UE. In accordance with the disclosure, the base station includes an antenna structure that is configured to radiate so as to define a coverage area in which to serve the UE, a backhaul interface through which to engage in backhaul communication with a gateway and with at least one neighboring base station, and a controller configured to manage the coordinated transmission. In particular, the controller is configured (i) to determine that the base station receives, via the backhaul interface from the gateway, data of a particular quality of service class for transmission via the antenna structure to the UE, (ii) to cause the base station to transmit the received data via the antenna structure to the UE, (iii) to determine a scheduling weight that the neighboring base station is set to apply for data of the particular quality of service class, (iv) to apply the determined scheduling weight to the received data so as to establish a proper subset of the received data, and (v) to cause the base station to send the established proper subset of the received data via the backhaul interface to the neighboring base station for transmission of the proper subset of data by the neighboring base station to the UE as well.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
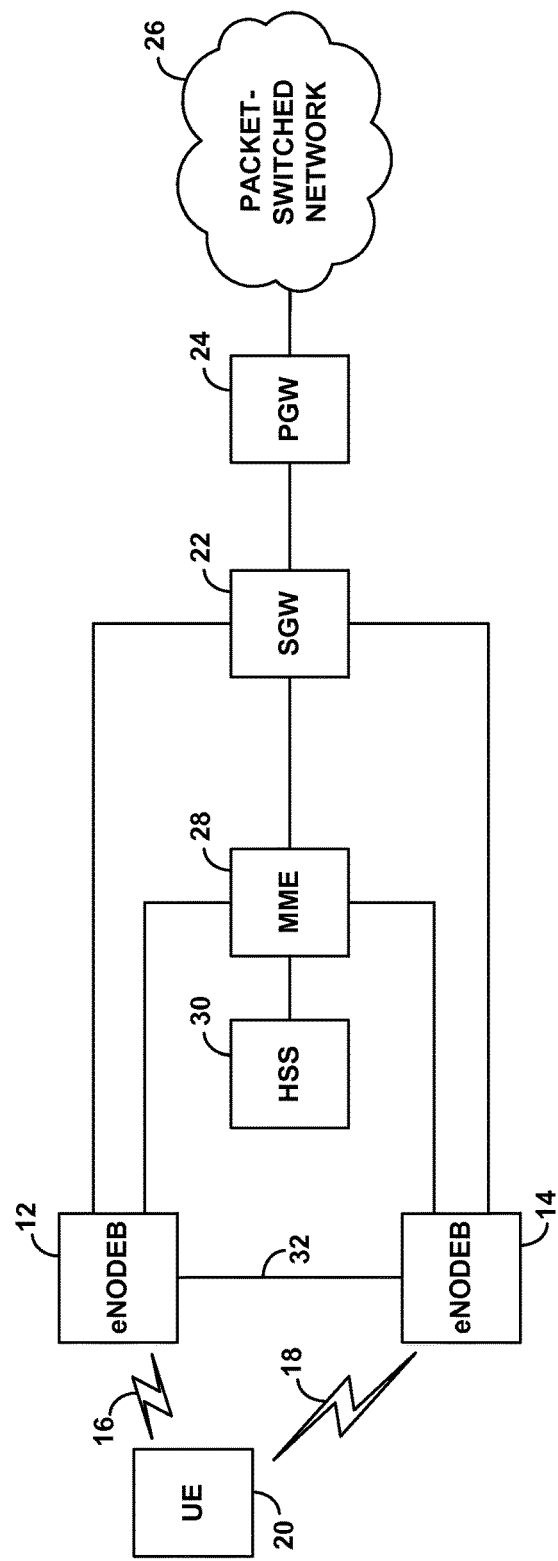
FIG. 1 is a simplified block diagram of an example network arrangement in which embodiments of the present disclosure can be implemented.

The present method and system will be described by way of example in the context of an LTE network. However, it should be understood that the principles described could be applied as well in numerous other contexts, not limited to the specifics described.

Referring to the drawings, as noted above, FIG. 1 is a simplified block diagram depicting an example LTE network arrangement including two representative LTE base stations (eNodeBs) 12, 14, each radiating to provide a respective cell 16, 18 that extends to a position where a representative UE 20 is operating. Both eNodeBs are in turn shown having respective communication interfaces with a serving gateway (SGW) 22, which is in turn shown having a communication interface with a packet data network gateway (PGW) 24 that provides connectivity with a packet-switched network 26 such as the Internet for instance. Further, both eNodeBs are also shown having respective communication interfaces with a mobility management entity (MME) 28, which in is in turn shown having a communication interface with the SGW 22 and with a home subscriber server (HSS) 30. And the eNodeBs are shown having a communication interface 32, such as an X2 interface, between each other.

In practice, the various network entities (e.g., eNodeBs, SGW, PGW, and MME) shown in FIG. 1 may sit as nodes on a private packet-switched network operated by a wireless service provider, and the illustrated communication interfaces may be logical connections through that private network. Each entity may have a network address (e.g., Internet Protocol (IP) address) on such a network, so that the entities can communicate with each other to and from their respective IP addresses. Further, numerous variations from this and other arrangements described herein may be possible, including but not limited to inclusion, omission, distribution, combination, duplication, or integration of one or more illustrated entities for instance.

In the example arrangement, UE 20 is attached with and therefore served by eNodeB 12. Such attachment may occur when the UE may detects a reference signal broadcast from eNodeB 12 and responsively transmits an attach message to eNodeB 12. Upon receipt of the attach message, eNodeB 12 may forward the attach message to the MME 28, and the MME may then engage in signaling with the HSS 30 to authenticate the UE and may establish a context record for the UE. The MME may then engage in signaling with the SGW 22 and the eNodeB 12, and the SGW may engage in signaling with the PGW 24. Through all of this signaling and/or subsequently, the MME may coordinate establishment for the UE of one or more bearers extending between the UE and the PGW, each including a radio-bearer portion between the UE and the eNodeB 12 and an access-bearer portion between the eNodeB 12 and the PGW (via the SGW).

Each such bearer may have a particular quality of service level designated by a quality of service class indicator (QCI), which may indicate how the network is to treat communications on the bearer, such as whether the network is to provide a guaranteed minimum bit rate or best-effort handling of data (among various other levels of quality), for instance, in line with standard LTE operation. Further, each such bearer might support communication of data of various types, such as data associated with various communication-applications, and/or data being communicated with particular remote entities (e.g., at particular IP addresses).

Further, the UE may then be served by eNodeB 12 in a connected mode or an idle mode. In the connected mode, the UE and eNodeB 12 have a logically established radio link on which eNodeB 12 may schedule data transmissions to and from the UE for communication over the UE's bearers. In the idle mode, such a radio link may not technically exist, but the UE may monitor air interface transmissions from eNodeB 12 for page messages and other overhead information, and the UE may transmit access requests to eNodeB 12 such as to request transition back to the connected mode in order to engage in bearer data communication.

In practice, in the connected mode, as the PGW 24 receives data destined to the UE, the PGW transmits that data via an appropriate bearer to the SGW, and the SGW transmits that data via the bearer to eNodeB 12. Upon receipt of the data, eNodeB 12 may then buffer the data while the eNodeB schedules transmission of the data via cell 16 to the UE, and eNodeB 12 then transmits the data to the UE according to that schedule. In this process, eNodeB 12 will be aware of the class of data received for transmission to the UE and may even buffer different classes of data separately to facilitate differential handling.

The class of data that an eNodeB receives in a given instance may take various forms. For example, the class may be the QCI of the bearer on which the data is being communicated or the identity of the communication application (e.g., which the eNodeB could determine based on deep packet inspection of setup signaling, addressing (e.g., IP addresses and/or ports), or the like. Alternatively or additionally, the class may be keyed to the UE being served, such as a subscription contract service level that the UE has (e.g., as indicated by the HSS for instance) or the like. Moreover, the class could be a QCI designation keyed to the UE's past communication history, such as one QCI designation if the UE is deemed a "heavy" user (e.g., excessive data communicator) and a different QCI designation if the UE is deemed a "normal" or "light" user. Numerous other examples of data classes may be possible as well. The class of data may be considered to define or be defined by a priority level of the data, perhaps in relation to other classes of data or the like.

According to LTE, the air interface between an eNodeB and a served UE spans a particular frequency bandwidth (or multiple such bandwidths) defining a continuum of subcarriers. In the time domain, the air interface is divided into a continuum of 10-millisecond frames, each divided into ten 1-millisecond subframes or transmission time intervals. (In a frequency division duplex (FDD) arrangement, all of these subframes per frame may be used for downlink communication; in a time division duplex (TDD) arrangement, just some of these subframes per frame may be used for downlink communication.) With this arrangement, a time-segment of each subframe is reserved across the frequency bandwidth to define a physical downlink control channel (PDCCH), and the remaining time of each subframe (except for portions used for other purposes) defines a physical downlink shared channel (PDSCH) for carrying bearer data and the like. The PDSCH in each subframe is then divided across the bandwidth into a sequence of physical resource blocks (PRBs) each spanning a group of subcarriers.

The eNodeBs in a region, such as eNodeB 12 and eNodeB 14 would optimally have the same air interface arrangement as each other, synchronized to have frames and subframes occur with the same timing so as to enable inter-eNodeB coordination with respect to particular air interface resources.

In practice, when the eNodeB has data for transmission over the air interface to a UE, the eNodeB schedules transmission of the data to occur on particular air interface resources defined by frequency and time, such as in one or more particular PRBs of one or more particular subframes And the eNodeB then transmits the data accordingly. In particular, the eNodeB may decide to transmit data to the UE in certain PRBs of a given subframe. To do so, the eNodeB may transmit to the UE on the PDCCH of that subframe a downlink control information (DCI) message that specifies the PRBs that carry the data, and the eNodeB may modulate the data on symbols in the specified PRBs of that subframe. The UE may thus receive and read the DCI to determine the PRBs that carry data to the UE and the UE may then read those PRBs and demodulate the symbols so as to receive the transmitted data.

As noted above, each eNodeB may have a table of data that defines scheduling weights that the eNodeB will apply per class of data, possibly defining per-class scheduling weights that vary based on time of day, based on cell load, and/or based on other factors. The eNodeB may then apply those scheduling weights in practice. For example, as discussed above, an eNodeB's scheduling weight for a class of data at issue may be 1:1, such that if the eNodeB receives a certain quantity of data per millisecond for transmission to the UE, the eNodeB would be set to transmit the data at that rate to the UE (with the understanding that additional buffering and issues may add overall delay to the process or otherwise impact the process). On the other hand an eNodeB's scheduling weight may be 1:3, such that if the eNodeB receives a certain quantity of data per millisecond for transmission to the UE, the eNodeB would be set to transmit just a third of that data to the UE per millisecond, buffering the rest. (These scheduling weights could be considered throttling rates, as they may limit output rate compared to input rate.) Other examples are possible as well.

An eNodeB may include a scheduler process that manages scheduling of data transmissions to UEs, and the scheduler process may refer to such policy data to determine what scheduling weight to apply for a transmission of a data of a given class to a UE. The scheduling process may then schedule the transmission as discussed above, optimally planning a schedule in advance of engaging in the transmission so as to beset manage resources.

In practice, when eNodeB 12 has received data of a particular class for transmission to UE 20, eNodeB 12 will transmit that data to the UE. For instance, this received data may be a portion of data that has arrived at eNodeB 12 for transmission to the UE and that eNodeB 12 will transmit to the UE in a given subframe, per the eNodeB's scheduling process. Further, based on UE signal strength reports or the like, eNodeB 12 may also decide to apply CoMP joint processing with neighboring eNodeB 14 and may apply that CoMP process with respect to the received data. Thus, in advance of transmitting the data to the UE, eNodeB 12 may also send the data to eNodeB 14 (via an X2 interface for instance) along with a directive that specifies to eNodeB 14 the air interface resources on which eNodeB 14 is to transmit the data as well. For instance, eNodeB 12 may transmit packet data to eNodeB 14 that carries the data for eNodeB 14 to transmit in cell 18 and that identifies the subframe in which that transmission is to occur and the PRB(s) on which the transmission is to occur, to coordinate concurrent transmission of the data by both eNodeB 12 and eNodeB 14. And eNodeB 14 may then itself schedule that transmission as directed. In the designated subframe, both eNodeB 12 and eNodeB 14 would transmit the same data in the same PRB(s), which the UE would receive in accordance with the DCI message that eNodeB 12 sends to the UE in that subframe.

Per the present method, however, to help eNodeB 14 comply with a scheduling policy in place at eNodeB 14, eNodeB 12 will limit the extent of data that it sends to eNodeB 14 based on consideration of the scheduling weight that eNodeB 14 is set to apply for the class of data at issue.

To facilitate this, eNodeB 12 may query eNodeB 14 for an indication of the scheduling weight that eNodeB 14 is set to apply (e.g., currently set to apply, in the event the scheduling weights at eNodeB 14 may change from time to time). For instance, eNodeB 12 may transmit to eNodeB 14 a query message that specifies the data class at issue, and eNodeB 14 may respond to eNodeB 12 with an indication of the scheduling weight that eNodeB is set to apply for that class of data. Alternatively, eNodeB 14 could broadcast or otherwise publish or report its table of scheduling weights or another indication of its scheduling weights to its neighbors such as to eNodeB 12 from time to time (e.g., in a Resource Status Message), such as whenever its policies change.

Given the scheduling weight that eNodeB 14 is set to apply for the class of data at issue (which eNodeB 14 would apply if it has received the data from SGW 22 for instance), eNodeB 12 will then apply that scheduling weight to the received data at issue so as to establish a proper subset of the received data to send to eNodeB 14 for transmission. For instance, if eNodeB 12 is operating with a scheduling weight of 1:1 for the data class at issue and eNodeB is operating with a data class of 1:2 for the data class at issue, eNodeB 12 could thereby throttle the output by a factor of ½ and thus send to eNodeB 14 just half of the data that eNodeB 12 will itself transmit to the UE. In practice, eNodeB 12 may then send that established proper subset of the received data to eNodeB 14 with a directive for eNodeB 14 to transmit the data on the particular air interface resources on which eNodeB 12 will be transmitting that data as well, thereby coordinating that concurrent transmission.

Further, as to the remainder of the received data that eNodeB 12 will be transmitting to the UE, eNodeB 12 may send to eNodeB 14 a directive for eNodeB 14 to forgo transmission on the air interface resources on which eNodeB 12 will be transmitting that remaining data, to help reduce interference for the UE's reception of that remaining data, and eNodeB 14 may comply with that directive as well.

Moreover, this process may continue on a per subframe basis to the extent appropriate, and may vary with respect to scheduling weights of different classes of data that eNodeB 12 may be transmitting to the UE.

Figure 2:
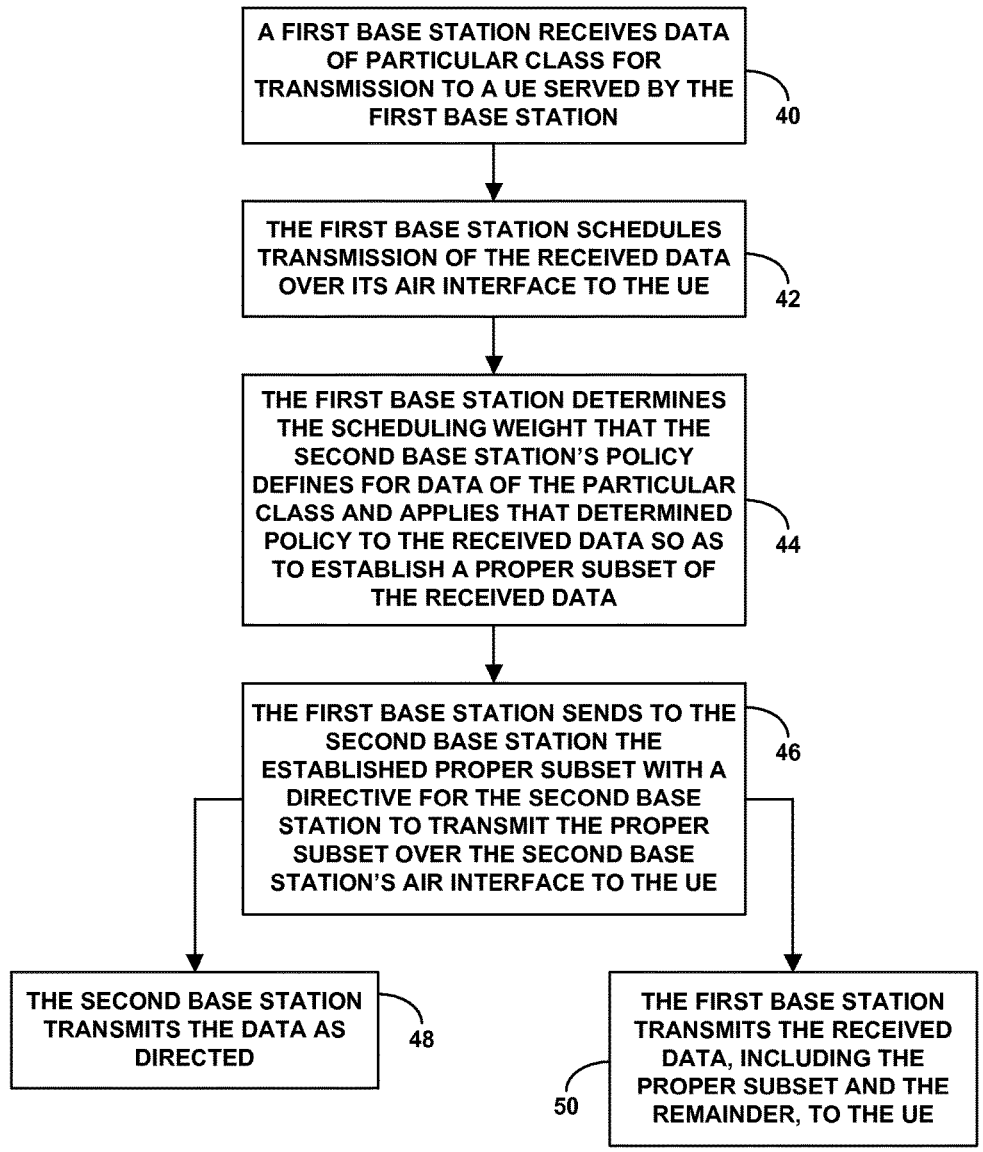
FIG. 2 is a flow chart depicting features of an example method.

FIG. 2 is next a flow chart illustrating some example operations in this process as may be carried out by a first base station such as eNodeB 12 when engaging in CoMP or the like with respect to a second base station such as eNodeB 14, where the second base station has a policy (e.g., as a stored table or the like, per the discussion above) that defines, for a particular class of data, a scheduling weight that the second base station is to apply for transmission of data of that particular class.

As shown in FIG. 2, at block 40, the first base station receives data of the particular class for transmission to a UE served by the first base station. At block 42, the first base station then schedules transmission of the received data over its air interface to the UE. Further, at block 44, the first base station determines (e.g., by present query/response messaging, or based on an earlier received indication) the scheduling weight that the second base station's policy defines for data of the particular class and applies that determined policy to the received data so as to establish a proper subset of the received data. And at block 46 (perhaps in response to having received a report from the UE indicating that the UE has detected coverage of the second base station), the first base station sends to the second base station the established proper subset with a directive for the second base station to transmit the proper subset over the second base station's air interface to the UE (with or without indicating that the data is for the UE), optimally on the same air interface resources (e.g., particular PRB(s) in a particular subframe) on which the first base station will be transmitting that proper subset of the data. And the second base station receives the data and directive and schedules the transmission as directed.

As shown at block 48, the second base station then transmits the data as directed. Further, at block 50, the first base station transmits the received data (including the proper subset and the remainder) to the UE, optimally concurrently with the second base station's transmission of the proper subset, thereby helping to improve the UE's reception of at least the proper subset of data in a manner consistent with the second base station's scheduling policy.

Figure 3:
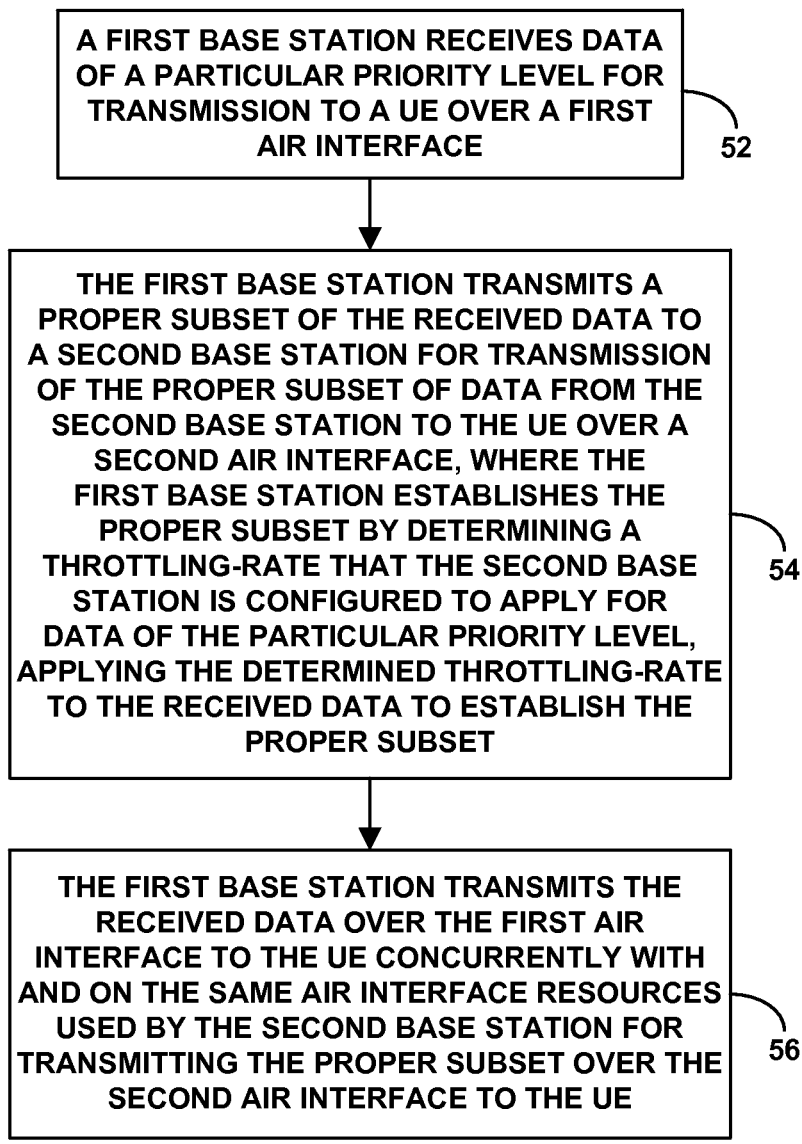
FIG. 3 is another flow chart depicting features of an example method.

FIG. 3 is next another flow chart depicting some example operations in this process as may be carried out by a first base station while the first base station is serving a UE over a first air interface between the first base station and the UE. At block 52, the first base station receives data of a particular priority level for transmission to the UE over the first air interface. At block 54, the first base station transmits a proper subset of the received data to a second base station for transmission of the proper subset of data from the second base station to the UE over a second air interface between the second base station and the UE, where the first base station establishes the proper subset by determining a throttling-rate that the second base station is configured to apply for data of the particular priority level, applying the determined throttling-rate to the received data to establish the proper subset. And at block 56, the first base station transmits the received data over the first air interface to the UE, including transmitting the proper subset optimally concurrently with and on the same air interface resources used by the second base station for transmitting the proper subset over the second air interface to the UE.

Figure 4:
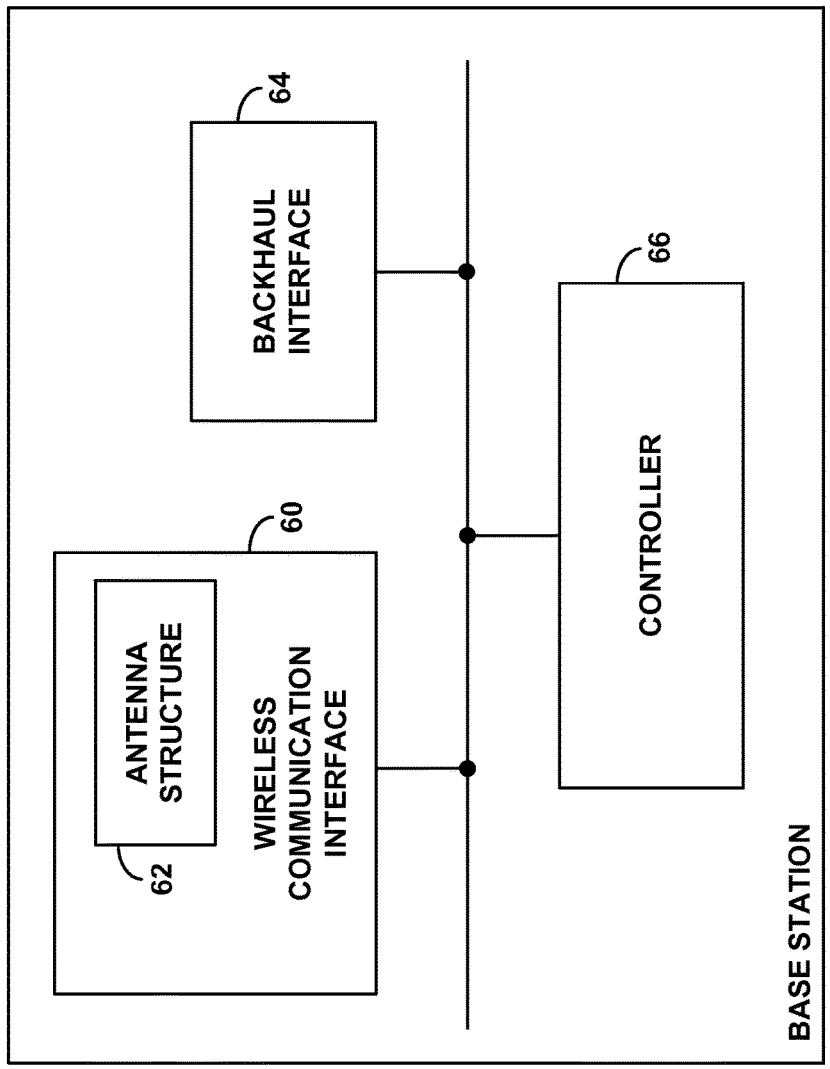
FIG. 4 is a simplified block diagram of an example base station operable in accordance with the disclosure.

Finally, FIG. 4 is a simplified block diagram of an example base station operable in accordance with the present disclosure. This base station could be a macro base station of the type typically including a tower mounted antenna structure and providing broad coverage, or a small cell (e.g., femtocell) of the type typically designed for use in a smaller area such as a home or office. As shown, the example base station includes a wireless communication interface 60 having an antenna structure 62 configured to radiate so as to define a coverage area in which the base station can serve a UE. Further, the base station includes a backhaul interface 64, such as one or more Ethernet interfaces for instance, enabling the base station to engage in backhaul communication with a gateway and with at least one neighboring base station. And the base station includes a controller 66 (e.g., one or more programmed processors or the like) configured to carry out operations such as those discussed above.

In line with the discussion above, for instance, the controller may be configured (i) to determine that the base station receives, via the backhaul interface from the gateway, data of a particular quality of service class for transmission via the antenna structure to the UE, (ii) to cause the base station to transmit the received data via the antenna structure to the UE, (iii) to determine a scheduling weight that the neighboring base station is set to apply for data of the particular quality of service class, (iv) to apply the determined scheduling weight to the received data so as to establish a proper subset of the received data, and (v) to cause the base station to send the established proper subset of the received data via the backhaul interface to the neighboring base station for transmission of the proper subset of data by the neighboring base station to the UE as well.

Exemplary embodiments have been described above. Those skilled in the art will understand, however, that changes and modifications may be made to these embodiments without departing from the true scope and spirit of the invention.

We claim:

1. A method of coordinated transmission of data in a wireless communication system, wherein the wireless communication system comprises a plurality of base stations including a first base station and a second base station, and wherein the second base station has a policy that defines, for a particular class of data, a respective scheduling weight that the second base station is to apply for transmission of data of the particular class, the method comprising:

receiving, by the first base station, data of the particular class for transmission by the first base station to a user equipment device (UE) served by the first base station, and transmitting by the first base station the received data to the UE over a first air interface between the first base station and the UE; and sending by the first base station to the second base station a proper subset of the received data, for transmission of the proper subset of the received data by the second base station to the UE over a second air interface between the second base station and the UE, wherein the first base station establishes the proper subset to send to the second base station by (i) determining what scheduling weight the second base station's policy defines for data of the particular class and (ii) applying the determined scheduling weight to the received data to establish the proper subset.

2. The method of claim 1, further comprising receiving by the first base station from the UE a report indicating that the UE has detected coverage of the second base station, wherein sending by the first base station to the second base station the proper subset of the received data is responsive to at least the first base station receiving the report.

3. The method of claim 1, wherein receiving, by the first base station, the data of the particular class for transmission to the UE comprises receiving by the first base station the data from a gateway via a bearer having a quality-of-service class indicator (QCI) corresponding with the class.

4. The method of claim 1, wherein transmitting by the first base station the received data to the UE over the first air interface includes transmitting by the first base station the proper subset of the received data on particular air interface resources to the UE, and wherein sending the proper subset of the received data to the second base station for transmission to the UE comprises instructing the second base station to transmit the proper subset of the received data on the same air interface resources.

5. The method of claim 4, wherein the first air interface defines a continuum of transmission time intervals (TTIs) and spans a frequency range defining a plurality of physical resource blocks per TTI, and wherein the second air interface defines the same continuum of TTIs and spans the same frequency range defining the same plurality of physical resource blocks per TTI, wherein the air interface resources are particular ones of the physical resource blocks.

6. The method of claim 1, wherein sending by the first base station to the second base station the proper subset of the received data comprises transmitting the proper subset of the received data via a packet-switched communication interface from the first base station to the second base station.

7. The method of claim 1, further comprising the second base station receiving the proper subset of data transmitted from the first base station, and the second base station transmitting the proper subset of data over the second air interface to the UE.

8. The method of claim 1, wherein determining what scheduling weight the second base station's policy defines for data of the particular class comprises receiving from the second base station a message that indicates the scheduling weight that the second base station's policy defines for the particular class.

9. A method of coordinated transmission of data in a wireless communication system, wherein the wireless communication system includes a first base station and a second base station, the method comprising:

serving, by the first base station, a user equipment device (UE) over a first air interface between the first base station and the UE;

while serving the UE over the first air interface, (i) receiving, by the first base station, data of a particular priority level for transmission to the UE over the first air interface, (ii) transmitting the received data, by the first base station, to the UE over the first air interface, and also (iii) transmitting a proper subset of the received data from the first base station to the second base station for transmission of the proper subset of data from the second base station to the UE over a second air interface between the second base station and the UE; and determining, by the first base station, a throttling-rate that the second base station is configured to apply for data of the particular priority level, wherein transmitting by the first base station the proper subset of data to the second base station for transmission of the proper subset of data to the UE comprises (a) responsive to the determining, applying, by the first base station, the determined throttling-rate to the received data to establish the proper subset of data, and (b) transmitting the established proper subset of data to the second base station for transmission to the UE.

10. The method of claim 9, further comprising receiving by the first base station from the UE a report indicating that the UE has detected coverage of the second base station, wherein transmitting the established proper subset of the received data from the first base station to the second base station for transmission to the UE is responsive to at least the first base station receiving the report.

11. The method of claim 9, wherein receiving, by the first base station, the data of the particular quality-of-service level for transmission to the UE over the first air interface comprises receiving by the first base station the data from a gateway via a bearer having the particular quality-of-service level.

12. The method of claim 9, wherein transmitting, by the first base station, the received data to the UE over the first air interface includes transmitting, by the first base station, the proper subset of data on particular air interface resources to the UE, and wherein transmitting the proper subset of data to the second base station for transmission to the UE comprises instructing the second base station to transmit the proper subset of data on the same air interface resources to the UE.

13. The method of claim 12,
wherein the first air interface defines a continuum of transmission time intervals (TTIs) and spans a frequency range defining a plurality of physical resource blocks per TTI, and wherein the second air interface defines the same continuum of TTIs and spans the same frequency range defining the same plurality of physical resource blocks per TTI,
wherein the air interface resources are particular ones of the physical resource blocks.

14. The method of claim 9, wherein transmitting the proper subset of the received data from the first base station to the second base station for transmission to the UE comprises transmitting the proper subset of the received data via a packet-switched communication interface from the first base station to the second base station.

15. The method of claim 9, further comprising the second base station receiving the proper subset of data transmitted from the first base station, and the second base station transmitting the proper subset of data over the second air interface to the UE.

16. The method of claim 9, wherein determining by the first base station the throttling-rate that the second base station is configured to apply for data of the particular priority level comprises receiving by the first base station from the second base station a message indicating the throttling-rate that the second base station is configured to apply for data of the particular priority level.

17. A base station configured to manage coordinated transmission of data to a user equipment device (UE), the base station comprising:
an antenna structure configured to radiate so as to define a coverage area in which to serve the UE; and
a backhaul interface through which the base station engages in backhaul communication with a gateway and with at least one neighboring base station;
wherein the base station is configured (i) to determine that the base station receives, via the backhaul interface from the gateway, data of a particular quality of service class for transmission via the antenna structure to the UE, (ii) to transmit the received data via the antenna structure to the UE, (iii) to determine a scheduling weight that the neighboring base station is set to apply for data of the particular quality of service class, (iv) to apply the determined scheduling weight to the received data so as to establish a proper subset of the received data, and (v) to send the established proper subset of the received data via the backhaul interface to the neighboring base station for transmission of the proper subset of data by the neighboring base station to the UE as well.

18. The base station of claim 17, wherein the base station is configured to transmit the received data on air interface resources to the UE, and wherein the base station is further configured to send along with the proper subset of data to the neighboring base station a directive for the neighboring base station to transmit the proper subset of data on the same air interface resources.

19. The base station of claim 18, wherein the air interface resources comprise particular physical resource blocks of an orthogonal frequency division multiple access (OFDMA) air interface.

20. The base station of claim 17, wherein the base station is configured to determine the scheduling weight that the neighboring base station is set to apply for data of the particular quality of service class by receiving from via the backhaul interface from the neighboring base station a message indicating the scheduling weight that the neighboring base station is set to apply for data of the particular quality of service class.

* * * * *